United States Patent
Buchan et al.

(10) Patent No.: US 7,741,003 B2
(45) Date of Patent: Jun. 22, 2010

(54) PHOTORESIST TRANSFER PADS

(75) Inventors: Nicholas I. Buchan, San Jose, CA (US); Cherngye Hwang, San Jose, CA (US); Timothy Reiley, Cupertino, CA (US); Li Zheng, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 435 days.

(21) Appl. No.: 10/814,933

(22) Filed: Mar. 30, 2004

(65) Prior Publication Data
US 2005/0219754 A1 Oct. 6, 2005

(51) Int. Cl.
*G03C 1/00* (2006.01)
*G11B 5/60* (2006.01)

(52) U.S. Cl. .................. 430/270.1; 430/271.1

(58) Field of Classification Search ........... 430/270.1
See application file for complete search history.

(56) References Cited

U.S. PATENT DOCUMENTS

| | | | |
|---|---|---|---|
| 4,564,585 A | | 1/1986 | Balske et al. |
| 4,736,048 A * | | 4/1988 | Brown et al. ............ 556/454 |
| 4,863,833 A | | 9/1989 | Fukuyama et al. |
| 4,992,354 A | | 2/1991 | Axon et al. |
| 5,254,523 A * | | 10/1993 | Fujimura et al. ............ 503/227 |
| 5,329,689 A | | 7/1994 | Azuma et al. |
| 5,452,658 A * | | 9/1995 | Shell ............ 101/401.1 |
| 5,457,081 A * | | 10/1995 | Takiguchi et al. ............ 503/227 |
| 5,566,075 A | | 10/1996 | Syouji et al. |
| 5,578,545 A * | | 11/1996 | Fujimura et al. ............ 503/227 |
| 5,817,242 A | | 10/1998 | Biebuyck et al. |
| 6,037,092 A * | | 3/2000 | Heeks et al. ............ 430/124 |
| 6,094,805 A | | 8/2000 | Iijima et al. |
| 6,200,882 B1 * | | 3/2001 | Drake et al. ............ 438/464 |
| 6,207,268 B1 | | 3/2001 | Kosaka et al. |
| 6,225,409 B1 * | | 5/2001 | Davis et al. ............ 525/104 |
| 6,252,741 B1 * | | 6/2001 | Ahn ............ 360/235.1 |
| 6,258,515 B1 | | 7/2001 | Sato et al. |
| 6,261,995 B1 * | | 7/2001 | Nakajima et al. ............ 503/227 |
| 6,287,475 B1 | | 9/2001 | Fukushima et al. |
| 6,374,479 B1 | | 4/2002 | Sasaki et al. |
| 6,471,882 B1 | | 10/2002 | Namikawa et al. |

(Continued)

FOREIGN PATENT DOCUMENTS

EP  1079275 A2 *  2/2001

(Continued)

*Primary Examiner*—Cynthia H Kelly
*Assistant Examiner*—Connie P Johnson
(74) *Attorney, Agent, or Firm*—G. Marlin Knight

(57) ABSTRACT

A resist transfer pad and method of use are described for forming a uniform photoresist on the surface of a workpiece such as a slider. The resist transfer pad includes a layer of cured polydimethylsiloxane (PDMS) on a cushioning layer, e.g. silicone rubber, and an optional stiffening layer. The sliders are preferably mounted on a carrier or pallet. In one preferred embodiment the loaded resist transfer pads are applied to the slider surface by roll lamination where the loaded resist transfer pad is transported by a roller system using a cover-tape and pressed against the slider surface. Subsequently the cover-tape and the resist transfer pad are lifted off and the photoresist remains on the transducer. An alternative embodiment uses a vacuum, piston laminator to press the loaded resist transfer pad onto the surface of the transducer.

9 Claims, 2 Drawing Sheets

U.S. PATENT DOCUMENTS

| | | | |
|---|---|---|---|
| 6,556,380 B2 * | 4/2003 | Bunch et al. | 360/235.1 |
| 6,676,996 B2 * | 1/2004 | Pickering et al. | 427/365 |
| 6,725,526 B2 * | 4/2004 | Lille | 29/603.1 |
| 6,821,626 B1 * | 11/2004 | Davis et al. | 428/421 |
| 2003/0197978 A1 * | 10/2003 | Otsuka et al. | 360/235.1 |
| 2005/0091836 A1 * | 5/2005 | Hwang et al. | 29/603.07 |
| 2005/0191582 A1 * | 9/2005 | Bietsch et al. | 430/311 |
| 2005/0199584 A1 * | 9/2005 | Nuzzo et al. | 216/54 |

FOREIGN PATENT DOCUMENTS

| | | |
|---|---|---|
| JP | 59069751 A1 | 4/1984 |
| JP | 3260654 A1 | 11/1991 |
| JP | 4052645 A1 | 2/1992 |
| JP | 7105650 A1 | 4/1995 |
| JP | 10064213 A1 | 3/1998 |
| JP | 2001006142 A1 | 1/2001 |

* cited by examiner

PHOTORESIST TRANSFER PADS

FIELD OF THE INVENTION

The invention relates to the field of lithography apparatus and methods for applying photoresist to a surface and more particularly to fabrication of features on an air-bearing surface of sliders (heads) used with moving media.

BACKGROUND OF THE INVENTION

In a typical prior art head and disk system a magnetic transducer is supported by the suspension as it flies above the disk. The magnetic transducer, usually called a "head" or "slider" is composed of elements that perform the task of writing magnetic transitions (the write head) and reading the magnetic transitions (the read head). The surface of the slider which confronts the media is patterned with features that control the air-bearing characteristics. The disk is attached to a spindle that is driven by a spindle motor to rotate the disk at sufficient speed to develop the air-bearing. In the typical process of fabricating thin film magnetic transducers, a large number of transducers are formed simultaneously on a wafer. After the basic transducer structures are formed the wafer may be sliced into rows or individual sliders which typically are further processed by lapping and formation of the air-bearing surface features by lithographic etching techniques.

FIG. 1 illustrates the ABS of slider 20 which is conventionally fabricated with a pattern of rails 26, 27 that extend toward the media from the slider body to determine the aerodynamics and serve as the contact area should the slider come in contact with the disk either while rotating or when stationary.

In prior art stamp lithography, stamps have been fabricated by casting polydimethylsiloxane (PDMS) on a master with a negative of the desired pattern. The PDMS stamp is peeled away from the master after curing and exposed to an "ink" transferred to the substrate by transient contact with the stamp. The elastomeric nature of the PDMS allows contact even on rough or curved surfaces. According to this method, features between 1 and 100 microns are achieved. For larger stamps and larger features (1 cm to 200 microns), the pattern is directly etched into the stamp by conventional UV lithography using a mild soap solution for dissolving those regions previously exposed to the UV light. When applying this method to lithography with submicron features, it was found that no reproducible results necessary for mass-production of ICs were attainable with a type of stamp as propagated by Kumar et al. A major limitation of this method of pattern transfer is the elastomer used as the carrier of the pattern. This material is deformable so that repeated, accurate transfer of the pattern to the substrate with high resolution, as necessary for practical lithography, is not possible.

In U.S. Pat. No. 5,817,242 to Biebuyck, et al. use of a composite stamp is described that includes a deformable or elastic layer for conformal contact, accommodating the fluctuations of the thickness of the substrate and impurities on its surface, and a second (patterned) layer, which carries the desired pattern. Suitable materials for the deformable or elastic layer are said to be polybutyldiene, polydimethylsiloxane (PDMS), polyacrylamide, polybutylstyrene and co-polymers of these types. The patterned layer should easily adhere to or absorb a specific "ink" material. Suitable materials could be organic, such as polystyrene or polymethylmethacrylate, metallic, such as gold, platinum, palladium, nickel, titanium and oxides thereof, or inorganic insulators like alumina, silicon, silica, or perovskites, depending on the desired properties and application. In a further preferred embodiment, the stamp comprises means for achieving a self-alignment. The means could either comprise key-and-lock type topological features, e.g. cone- or pyramid-shaped protrusions and holes, which after a sufficiently accurate pre-positioning by stepping drives guide the stamp into the desired final position. A preferred means for self-aligning the stamp and the substrate however exploits surface tension gradients provided on the surface of the stamp and/or substrate.

In U.S. Pat. No. 6,094,805 to Iijima, et al., a method for manufacturing a magnetic head is described using a resist sheet (an organic resist film on a supporting body) which is placed on the air bearing surface to transfer the resist film on to the air bearing surface, after which, the supporting body is removed. The supporting body is a flexible film, constituted of polyethylene terephthalate or the like.

In U.S. Pat. No. 4,564,585 to Balske, et al., a process for applying photoresist to a row of sliders is described. The row of sliders is mounted in a fixture by bonding with an adhesive. The slider row extends 1 mil. above the fixture surface. The fixture and row are inserted between two rollers of a laminating machine. The upper roller pressure applies a sheet of dry film photoresist material so that it adheres as a layer on the row.

SUMMARY OF THE INVENTION

A method and related apparatus are described for forming a uniform photoresist on the surface of a workpiece using a resist transfer pad. The resist transfer pad includes a layer of cured polydimethylsiloxane (PDMS) on a cushioning layer, e.g. silicone rubber, and an optional stiffening layer. The photoresist is applied to the resist transfer pad by a conventional method such as spin coating. The workpiece is preferably a slider (transducer) on which air-bearing features will be fabricated. The sliders are preferably mounted on a carrier or pallet. In one preferred embodiment the loaded resist transfer pads are applied to the slider surface by roll lamination where the loaded resist transfer pad is transported by a roller system using a cover-tape and pressed against the slider surface. The resist transfer pad in this embodiment temporarily adheres to the slider and separates from the roller system. Subsequently the cover-tape and the resist transfer pad is lifted off and the photoresist remains on the transducer.

An alternative embodiment uses a vacuum, piston laminator to press the loaded resist transfer pad onto the surface of the transducer. In this embodiment as well the resist transfer pad is lifted off and the photoresist remains on the transducer.

DETAILED DESCRIPTION OF THE INVENTION AND THE PREFERRED EMBODIMENTS

Figure 1:
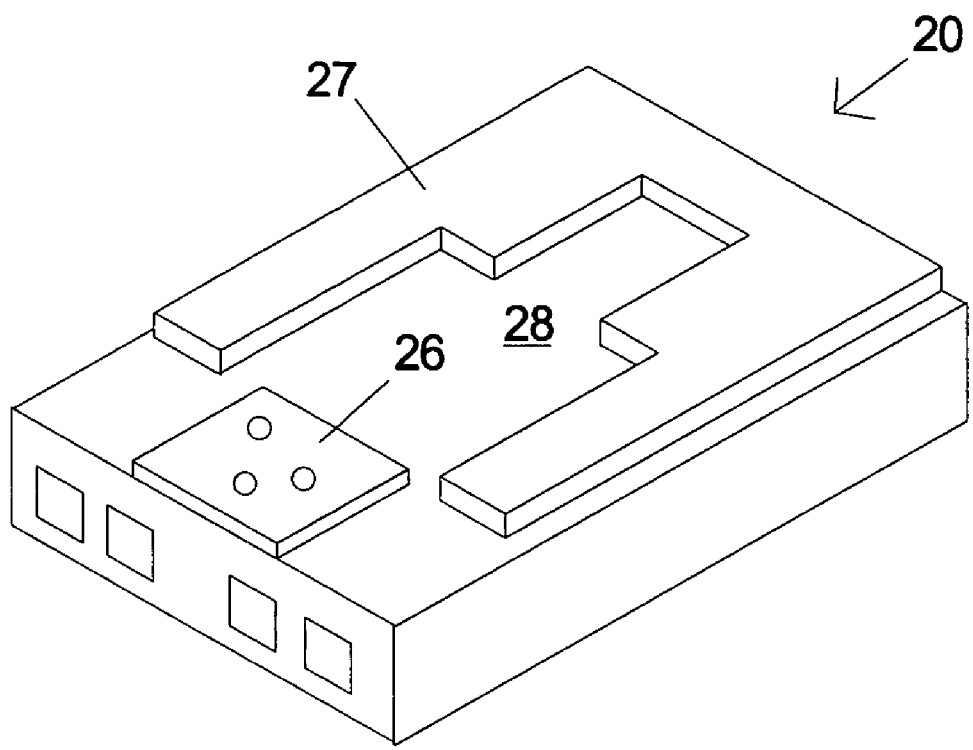
FIG. 1 is an illustration of a prior art air-bearing surface features of a slider.
Figure 2:
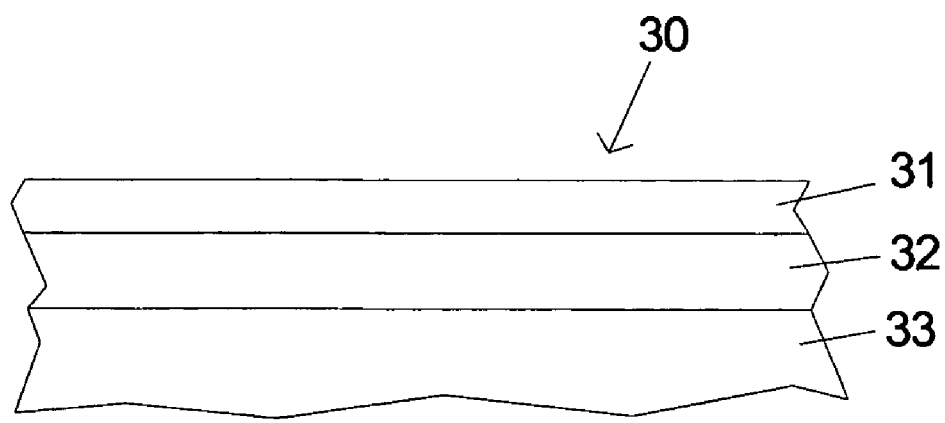
FIG. 2 is an illustration of the layer structure of a resist transfer pad according to the invention.

FIG. 2 illustrates that layer structure of a resist transfer pad 30 according to the invention. The transfer layer 31 is selected to be smooth, nonreactive and to have low adhesion to the photoresist. The preferred material for the transfer layer 31 is polydimethylsiloxane (PDMS). Although other polymers can be used in place of PDMS, PDMS is particularly preferred because of its low surface energy. The thickness of the PDMS layer is selected to be thin enough to not excessively deform when pressed against the slider surface. A typical range might be from 10 to 100 microns. Under the transfer layer 31 is a cushion layer 32 which is designed to provide flexible support so that the resist transfer pad will tend to conform to the large scale topography of the target surface and smooth out local irregularities. One consequence of excessive local conformation is "rolloff" which is excessive thinning at the edges. Thus, the hardness of the cushioning layer 32 can be selected according to the specific application, i.e., the nonplanarity of the surface of the slider and the desired tradeoff between conformity for long range topography and smooth local irregularities. The cushion layer 32 is preferably silicone rubber, but other rubber alternatives can be used. The material for the cushion layer is selected to be compatible with PDMS and its curing agent. The curing agent is typically supplied by the manufacturer. One commercially available curing agent contains a proprietary platinum-based catalyst that catalyzes the addition of the SiH bond across the vinyl groups, forming Si—$CH_2$—$CH_2$—Si linkages. PDMS is cured by an organometallic crosslinking reaction. The resistance of the cushion layer material to the curing agent must be determined empirically. The thickness of the preferred silicone rubber cushion layer is preferably from 0.5 to 3 mm for sliders, but use on other parts with a different surface topography could require other thicknesses. Optionally a stiffener layer 33 can be included which can be a higher modulus material such as Mylar. The thickness of the stiffener layer 33 is preferably about 0.1 to 1 mm. The function of the stiffener layer 33 is to help keep the pad flat during resist spinning and the actual resist transfer.

Figure 3:
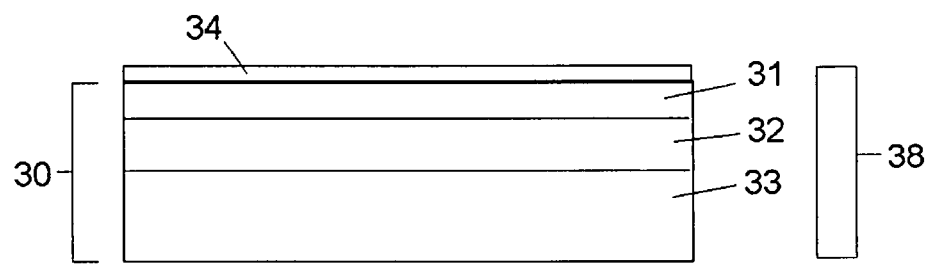
FIG. 3 illustrates an embodiment of the loaded resist transfer pad.

FIG. 3 illustrates an embodiment of the loaded resist transfer pad 38 with photoresist 34. The photoresist 34 can be applied to resist transfer pad 30 by a conventional means such as a spin-stand used to rotate the resist transfer pad 30 while liquid photoresist is applied and allowed to spin out to a consistent, thin level. Positive tone liquid photoresist is preferred to avoid the ledging problems associated with negative tone dry resist. The invention aids in the use of liquid photoresist on the nonplanar surface of the sliders which is well known weakness of liquid photoresist. After the photoresist is applied to resist transfer pad an appropriate curing process such as storing the loaded resist transfer pad in a small volume closed container for selected period of time.

Figure 4:
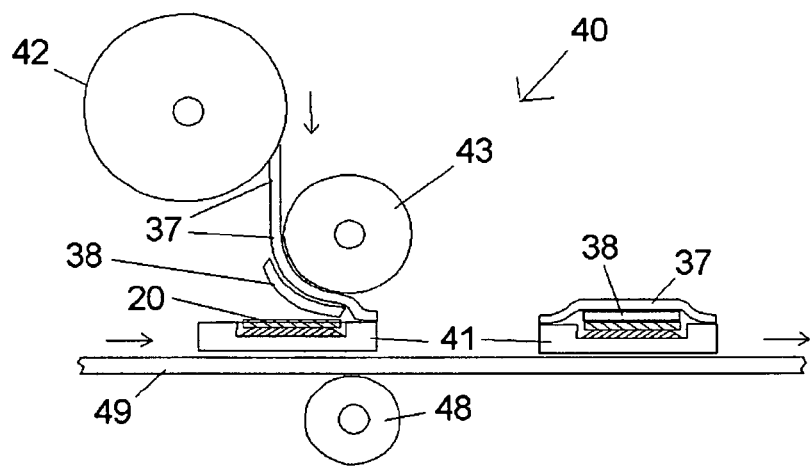
FIG. 4 illustrates an embodiment of an apparatus using rollers for applying the resist transfer pad loaded with photoresist to the slider surface.

The loaded resist transfer pad 38 can be applied to the surface of a slider by conventional means including manually although an automated means is deemed preferable. FIG. 4 illustrates an embodiment of an apparatus 40 using rollers to apply the loaded resist transfer pad 38 to the slider 20 surface. For mechanical stability, etc. the sliders 20 are preferably mounted in carriers and transported by pallets 41 which are moved by a conventional conveyor system 49. Support roller 48 is positioned under the conveyor 49 to provide a rigid position for the slider as it passes under the roller with the loaded resist transfer pad 38. The loaded resist transfer pads 38 are held by a cover-tape 37 which is fed from reel 42. The loaded resist transfer pad 38 is pressed against the slider surface by roller 43 as the pallet moves on the conveyor 49. A section of cover-tape 37 is cut by prior art (not shown) and adheres to and moves with the pallet as it clears the roller 43. The pallet 41 with a section of cover-tape 37 and the loaded resist transfer pad 38 continues forward with the slider 20 and pallet 41. The cover-tape 37 and the resist transfer pad 30 must be removed from the slider 20 before lithography processing. The resist transfer pad 30 can be removed by any conventional means including manual means. The photoresist 34 remains on the slider surface when the resist transfer pad is removed.

An alternative embodiment uses piston laminator to press the loaded resist transfer pad onto the surface of the transducer. Preferably the piston laminator operates in a vacuum chamber to help reduce bubbles trapped in the photoresist. The loaded resist transfer pad is placed on the press plate which is then pressed against the slider surface. In this embodiment as well the resist transfer pad is lifted off and the photoresist remains on the transducer.

Conventionally multiple applications of photoresist are required to fabricate a complete set of features on an air-bearing surface. The resist transfer pads of the invention can be used for some or all of these steps. The invention can be used with a any etching technique for which photoresist can be used as a mask including deep ion milling.

Except where express materials, thickness values, etc., have been given above, the layers, structures and materials embodying the invention are according to the prior art and are fabricated according to the prior art.

The compositions given herein have been described without regard to small amounts of impurities that are inevitably present in practical embodiments as is well known to those skilled in the art.

Although the embodiments of the invention have been described in a particular embodiment, the invention as described herein is not limited to this application and various changes and modifications will be apparent to those skilled in the art which will be within the scope of the invention.

The invention claimed is:

1. A structure for applying photoresist to a surface of a workpiece comprising:
    a photoresist transfer pad comprising a transfer layer of polydimethylsiloxane with a transferable coating of photoresist on an outer surface of the transfer layer, and a cushion layer consisting of rubber under the transfer layer, the cushion layer providing flexible support for the transfer layer; and
    a cover-tape holding the photoresist transfer pad opposite to the layer of photoresist, the cover-tape being larger in area than the photoresist transfer pad and extending beyond at least first and second edges of the photoresist transfer pad.

2. A structure for applying photoresist to a surface of a workpiece comprising:
    a photoresist transfer pad comprising a transfer layer of polydimethylsiloxane with a transferable coating of photoresist on an outer surface of the transfer layer, a cushion layer consisting of rubber under the transfer layer, the cushion layer providing flexible support for the transfer layer, and a stiffener layer attached to the cushion layer and
    a cover-tape holding the photoresist transfer pad.

3. A structure for applying photoresist to a surface of a workpiece comprising:
    a cover-tape; and
    at least two photoresist transfer pads held by the cover-tape, the photoresist transfer pads comprising a polymer layer with a transferable coating of photoresist on an outer surface of the polymer layer, and a cushion layer under the polymer layer opposite the transferable coating of photoresist.

4. The structure of claim 3 wherein the polymer layer consists of polydimethylsiloxane.

5. The structure of claim 3 wherein the photoresist transfer pads further comprise a stiffener layer attached to the cushion layer.

6. The structure of claim 3 wherein the photoresist transfer pads further comprise a stiffener layer attached to the cushion layer, the polymer layer consists of polydimethylsiloxane and the cushion layer consists of silicone rubber.

7. The pad of claim 3 wherein the cushion layer consists of silicone rubber.

8. The structure of claim 3 wherein the cover-tape and photoresist pads are formed into a roll.

9. The structure of claim 8 wherein the photoresist pads are sequentially disposed on the cover-tape so that unrolling the roll sequentially exposes the photoresist pads.

* * * * *